Sept. 22, 1953     M. PEGARD     2,652,804
INDICATING DEVICE FOR MACHINE TOOLS
Filed Dec. 6, 1945     3 Sheets-Sheet 1

Sept. 22, 1953 M. PEGARD 2,652,804
INDICATING DEVICE FOR MACHINE TOOLS
Filed Dec. 6, 1945 3 Sheets-Sheet 2

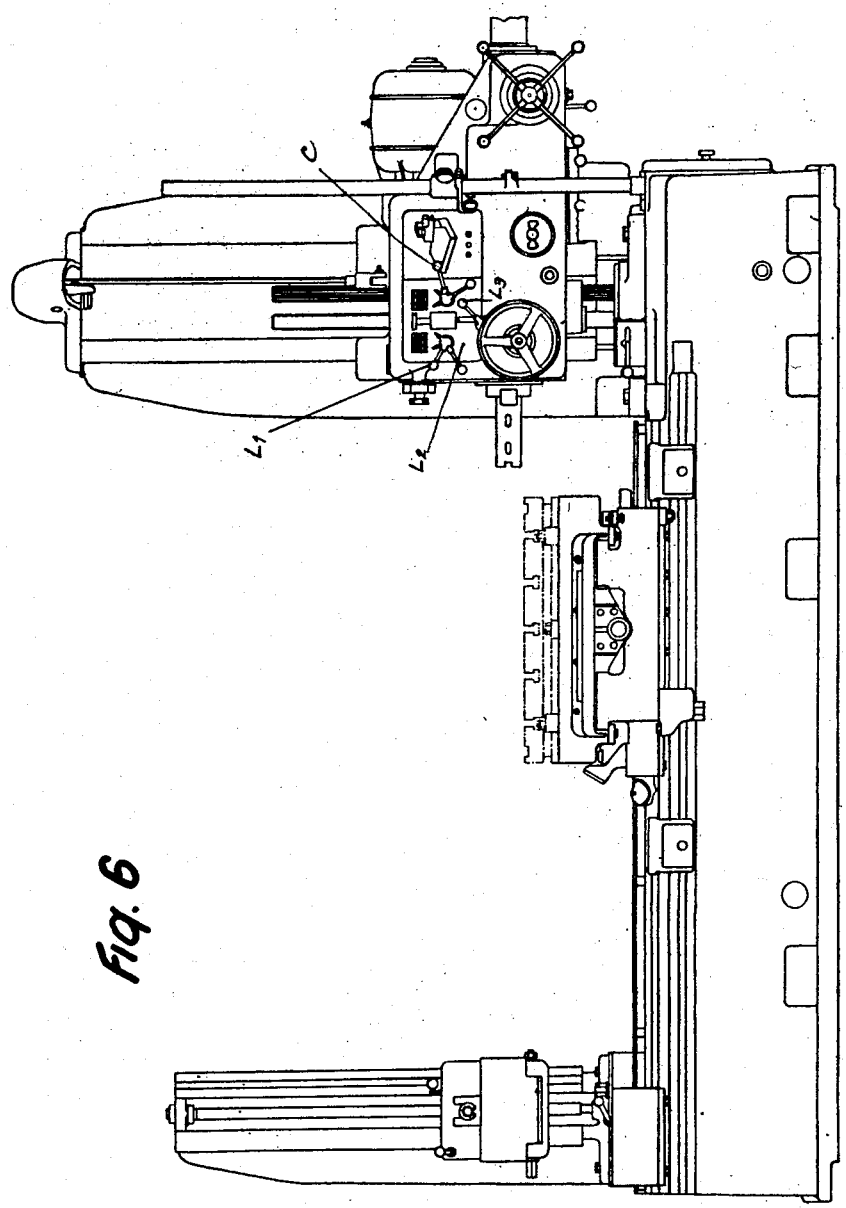

Patented Sept. 22, 1953

2,652,804

UNITED STATES PATENT OFFICE 2,652,804

INDICATING DEVICE FOR MACHINE TOOLS

Marcel Pégard, Paris, France

Application December 6, 1945, Serial No. 633,184
In France January 31, 1942

Section 1, Public Law 690, August 8, 1946
Patent expires January 31, 1962

11 Claims. (Cl. 116—135)

The present invention relates to indicators, and more particularly to an indicator for a machine tool which shows the operator thereof the settings of the various controls of the tool at any time. Since the settings of the controls of the tool determine the operation of the tool on the work piece, the indicator also gives an indirect indication of the operation of the tool.

For instance, my indicator may be used with a boring machine for indicating the settings of the control mechanisms determining the cutting speeds and the advances or feeds of the tool and may also be used to indicate the speeds of rotation of the surfacing plate and the advances or feeds of the tool corresponding to the speeds of rotation of the plate.

The control mechanism itself may be of conventional nature and may be of the type shown in my Patent No. 2,488,324, issued November 15, 1949, and particularly as shown in Figs. 3, 4 and 8 of the patent.

The indicator of my invention comprises a pair of cooperating indicating devices, one of the devices being a movable member having a plurality of faces on which information is arranged in a plurality of columns and rows. The information may indicate, for instance, the cutting speeds of the tool and the speeds of rotation of the surfacing plate. A pair of windows may be provided in an appropriate plate, e. g. the bed plate of a machine tool, through which one face of the movable member may be exhibited at a time. The movable member may be a polygonal drum rotatable by a control member to move one face after another before the window in the bed plate.

The control levers of the machine tool which select the conditions of the tool, e. g. the cutting speeds and the speeds of rotation may be located in the vicinity of the movable indicating device and may indicate, through cooperation with suitable marks or signals, the information correlated to the settings of the controls.

Adjacent the first indicating device a second indicating device carrying information of other conditions of the tool, e. g. the advances or feeds for which the controlling mechanism of the tool is set, may be located. This information may be also arranged in a series of columns and rows correlated to the columns and rows of information on the first indicating device.

The first indicating device may be used to exhibit two different sets of information, e. g. the cutting speeds of the tool and the rotational speed of the surfacing plate. The advances or feeds correlated to the cutting speeds of the tool are different from those correlated to the rotational speed of the cutting plate. Consequently, the second indicating device may also have a pair of sets of information, one set being correlated to the cutting speed of the tool and representing the advance or feed and the other set being correlated to the rotational speed of the surfacing plate and also indicating the advance or feed. Means are provided to obscure one of the two sets of information carried by the second indicating device, said means being under the control of the movable first indicating device so that only the set of information carried by the second indicating device correlated to the set of information exhibited by the first indicating device is visible. The second indicating device may be a plate carrying at least two sets of information and the obscuring means may be a movable grid located between the plate and a viewing window positioned opposite said plate in the bed plate of the tool. The grid may have a plurality of slots extending therethrough to permit observation of a selected set of information and may be movable to control which set of information is to be visible.

In the annexed drawings, I have illustrated solely by way of example an embodiment of my invention.

In the drawings:

Fig. 6 illustrates the mounting of my improved device on the spindle-holding carriage of a boring machine.

Figure 1:
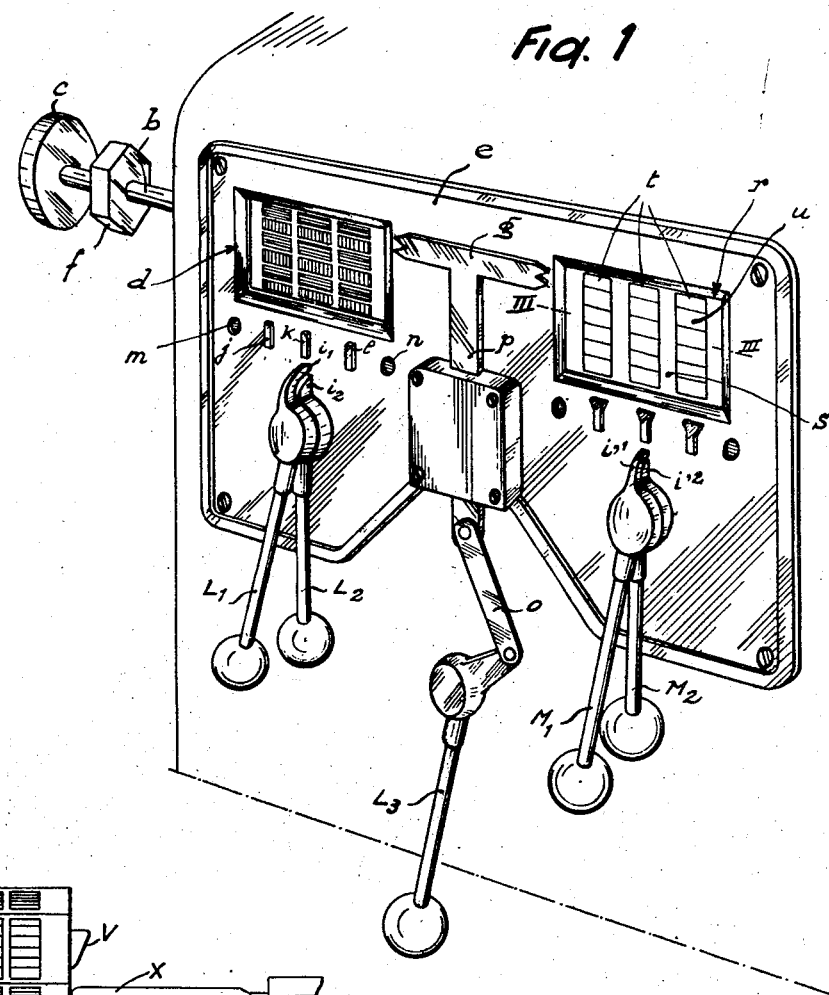
Fig. 1 is an elevational view of the novel indicator.
Figure 2A:
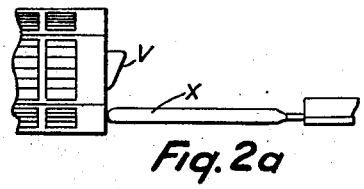
Fig. 2a is a plan view of the apparatus of Fig. 2.
Figure 3:
Fig. 3 is a cross-section taken on the line III—III of Fig. 1.
Figure 2:
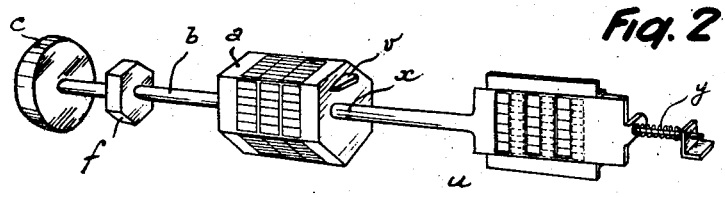
Fig. 2 is an elevational view of the indicator with the bed plates removed.
Figure 4:
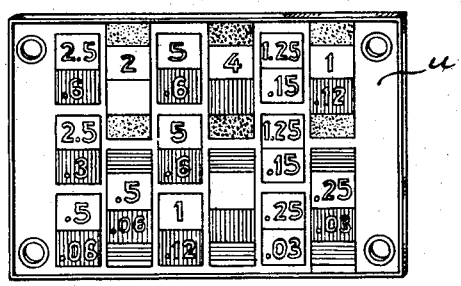
Fig. 4 is a front view of the plate indicating the advances.

As apparent on the drawing, the novel arrangement includes a polygonal drum $a$ (Fig. 2) carried by a shaft $b$. A control knob $c$ attached to the shaft $b$ allows rotary movement of the drum $a$ about its axis so as to bring the desired face of the drum in front of the window $d$ in the front plate $e$ of the device (Fig. 1).

A small polygonal block $f$ having the same number of sides as the drum $a$ is keyed to the shaft $b$. It carries on each of its sides the value of a usual linear cutting speed.

Each face of the drum $a$ is subdivided into vertical columns and horizontal rows. In the compartments thus defined are written down the values of the diameters to be machined (or of the spindle diameters) which for a linear cutting speed of a given metal correspond to the proper rotation to be executed.

In the example illustrated, each face carries six horizontal rows and three vertical columns. The horizontal rows may be arranged in groups, each row of each group being distinguished from the other rows in the group by colour. In the specific example illustrated, the horizontal rows are arranged in groups of two, the rows being of alternate colours, say red and blue.

The different sliding gears (not shown) of the machine providing the speed combinations which allow the attainment, in the example illustrated of eighteen speeds, are controlled by three levers L1, L2 and L3.

The three levers L1, L2, L3 are also shown in Fig. 6; the levers L1 and L2 are the change speed levers for the spindle; the lever L3 is a change speed lever for the spindle and the advances.

The lever L2 may assume three positions, corresponding to three speeds. In each of these positions, a pointer $i$ carried by the lever L2 comes into register with one of the three lines or signals $j$, $k$, or $l$ lying in vertical alignment with the corresponding compartment columns of the face of the drum $a$ visible through the window $d$ (Fig. 1).

The lever L1 may assume two operating positions corresponding to two speeds, for each of which a pointer $i$ integral therewith is located in front of a disc $m$ or $n$ of different colours, say blue or red.

Lastly, the lever L3 controls, through the agency of a connecting rod $o$, a rod $p$ provided with a horizontal cross-bar $g$ forming a double pointer cooperating both with the left-hand indicating device described hereinabove and with the right hand indicating device described hereinbelow.

The three levers having received given positions, the lever L2 indicates the column to be read, the lever L1 the colour of the compartment and the lever L3 the compartment of the selected colour in the column considered, the value of which is to be read.

To the right hand side of the apparatus lies the advance indicating device which is constituted as follows.

Figure 5:
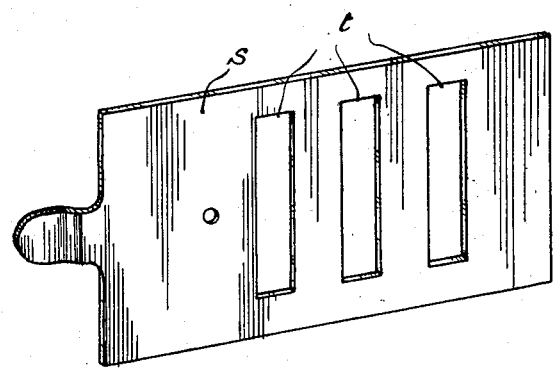
Fig. 5 is a separate view of the grid.

The front plate of the device is provided with a rectangular window $r$ inside which appears a grid $s$ provided with three vertical slots $t$ (Fig. 5). Behind this grid lies an indicating plate $u$ subdivided into six columns. The odd-numbered columns indicate the various advances or feeds of the machine and the even-numbered columns those of the surfacing plate, or reversely. Each column is subdivided into superposed compartments of different colours.

Two control levers M1 and M2 are arranged underneath said indicating device. Said levers are the same as those shown at $c$ in the general view of the boring machine (Fig. 6), i. e. the levers for changing the advances or feeds.

These levers carry pointers $i'^1$ and $i'^2$, similar to the pointers on the levers L1 and L2. Thus, when a certain position is given to the three levers M1, M2 and L3, the pointers $i'^1$ and $i'^2$ indicate the compartment inside which the value of the advances should be read.

But if, in the left hand indicating device, the face, or one of the faces indicating the speeds of the plate rather than of the spindle, is caused to appear through the window $r$, the values shown in, say, the even-numbered columns of the right hand or second indicating device are no longer valid and should be replaced by the indications shown in the odd-numbered columns. To this end, the grid $s$ should be shifted laterally in front of the plate $u$, thus allowing observation of the odd-numbered columns and obscuring the even-numbered columns. This action is here provided by the cooperation of a cam $v$ with an extension $x$ of the grid $s$. The end of the extension lies adjacent the side of the drum $a$, so that, on movement of the drum $a$ to a position such that the face or faces showing the rotational speeds of the surfacing plate appears in front of the window $d$, the cam $v$ moves the extension $x$ away from the drum, thus moving the grid $s$ against the action of the return spring $y$ to uncover the odd-numbered columns and cover the even-numbered columns of the plate $u$. In the example illustrated, the sixth face only of the drum $a$ is used for the rotary speeds of the surfacing plate. Consequently, only one cam $v$ is provided on the side of the rotary drum $a$ for shifting the grid when the said sixth face of the drum appears in front of the window $d$. But if the arrangement of the machine is such that several faces of the drum carry values or information correlated to the speeds of rotation of the plate, the drum is provided with as many cams, so that the grid is moved against the action of the spring every time a face of the drum indicating rotary speed of the surfacing plate appears in front of the window $d$.

From the above, it is apparent that when the movable indicating device $a$, here a rotary drum, is provided with two different sets of information for indicating different conditions of the machine, the second indicating device also carries two sets of information, one of the sets being correlated to one set of information on the first indicating device and the other set of information carried by the second indicating device being correlated to the second set of information exhibited by the first indicating device. The grid and cam arrangement provided in the present invention makes it certain that only the set of information carried by the second indicating device which is correlated to the set of information exhibited by the first indicating device is visible to the operator of the machine or tool through the window opposite the second indicating device. It is also obvious that the specific information to be read in each indicating device is clearly indicated without ambiguity by the cooperation between the control levers and the signal means provided for each indicating device.

Obviously, within the scope of the invention, the detailed arrangements of the indicating devices and of the signal means may be varied in accordance with the particular machine or tool.

I claim:

1. In a machine tool having a plurality of control levers for controlling conditions of the tool, an indicator comprising an information carrier exhibiting a set of information correlated with all settings of the control levers, said set of information being arranged in columns and rows, a first signal means having a plurality of signals, one of said signals being positioned adjacent each of said columns, one of said control levers being cooperable with said signals of said first signal means to indicate the column of information correlated with each setting of said one control lever, a second of said control levers having a pointer connected thereto movable therewith to indicate the group of adjacent rows of said set of information within which the information correlated with each setting of said second control lever is located, and a second signal means having a signal for each row of said group of adjacent rows of information, a third one of said control levers being cooperable with the signals of said second signal means to indicate the row of said group of adjacent rows of information correlated with each setting of said third control lever.

2. An indicator comprising a movable first indicating device operable in one position to exhibit one set of information and in another position to exhibit another set of information, a second indicating device carrying a first set of information correlated to said one set of information and a second set of information correlated to said other set of information, means operable in one position to obscure said first set of information carried by said second indicating device and operable in another position to obscure said second set of information carried thereby, means operable by movement of said first indicating device from said one position to said other position to cause movement of said obscuring means to said one position and means operable upon movement of said first indicating device from said other position to said one position to cause movement of said obscuring means to said other position, whereby only the set of information carried by the second indicating device correlated to the set of information exhibited by the first indicating device is visible.

3. An indicator as defined in claim 2 in which said first set of information and said second set of information are each arranged on said second indicating device in at least one column, said columns being spaced apart and substantially parallel to each other, and said obscuring means is an opaque grid having at least one slot therethrough conforming in configuration to said columns of said first and second sets of information.

4. An indicator comprising a movable first indicating device operable in one position to exhibit one set of information and in another position to exhibit another set of information, a second indicating device carrying in at least one column a first set of information correlated to said one set of information of said first indicating device and in at least one column spaced from and substantially parallel to said one column of said first set of information a second set of information correlated to said other set of information on said first indicating device, an opaque grid having at least one slot therethrough conforming in configuration to said columns of said first and second sets of information carried by the second indicating device, said grid being movable to position said slot opposite said column of said second set of information carried by the second indicating device when the first indicating device is moved from said one position to said other position and to position said slot opposite said column of said first set of information carried by the second indicating device when the first indicating device is moved from said other position to said one position, resilient means urging said grid to the location in which said slot is positioned opposite said column of said first set of information carried by the second indicating device, said grid having an extension with a face positioned adjacent said first indicating device, and a cam carried by the first indicating device operable to contact said face and move said grid to the location in which said slot is positioned opposite said column of said second set of information carried by the second indicating device when the first indicating device is moved from said one position to said other position.

5. An indicator as defined in claim 4 in which said first indicating device is a polygonal drum having information on its faces, said one set of information being on at least one of said faces and said other set of information being on at least one of its other faces, one of said faces being exhibited at a time and said drum being rotatable to change the face exhibited, and said second indicating device is a plate carrying said first and said second sets of information.

6. In a machine tool having a plurality of control members for controlling conditions of the tool, an indicator comprising a first indicating device exhibiting in one position one set of information arranged in columns and rows and in another position another set of information arranged in columns and rows, a first signal means having a signal for each of said columns of the information exhibited by said first indicating device, a second signal means having signals corresponding to said rows of the information exhibited by said first indicating device, at least one of the control members being cooperable with the signals of said first signal means to indicate the column of information exhibited by the first indicating device correlated to the setting of said one control member and at least one of the other control members being cooperable with the signals of said second signal means to indicate the row of information exhibited by the first indicating device correlated to the setting of said one of the other control members, a second indicating device carrying a first set of information correlated to said one set of information exhibited by the first indicating device and a second set of information correlated to said other set of information carried thereby, means operable in one position to obscure said first set of information carried by the second indicating device and in another position to obscure said second set of information carried thereby, means operable by movement of said first indicating device from said one position to said other position to cause movement of said obscuring means to said one position, means operable upon movement of said first indicating device from said other position to said one position to cause movement of said obscuring means to said other position, whereby the proper column and row of the information exhibited by the first indicating device correlated to the settings of said control members is indicated and only the set of information carried by the second indicating device correlated to the set of information exhibited by the first indicating device is visible.

7. The apparatus defined by claim 6 in which said first and said second sets of information are each arranged on said second indicating device in at least one column, said columns being spaced apart and substantially parallel to each other, and said obscuring means is an opaque grid having at least one slot therethrough conforming in configuration to said columns of said first and second sets of information carried by the second indicating device.

8. The apparatus defined by claim 6 in which said first signal means has one signal aligned with each of said columns of information exhibited by the first indicating device, said one of the control members being movable to positions adjacent each of the signals of said first signal means, said second signal means has a signal corresponding to the even-numbered rows of information exhibited by the first indicating device and a signal corresponding to the odd-numbered rows of information exhibited by the first indicating device, one of the other of said control members being movable to positions adjacent each of the signals of said second signal means, and another of the other of said control members having a pointer connected thereto for movement therewith to positions adjacent each of the groups of one odd-numbered and one even-numbered column of information.

9. In a machine tool having at least four control means for controlling at least four conditions of the tool, in which each of said control means has a plurality of control members; an indicator comprising a first indicating device exhibiting in one posiiton one set of information correlated to the settings of the control members of the first of said control means and in another position exhibiting another set of information correlated to the settings of the control members of the second of said control means, said sets of information being arranged in columns and rows on said first indicating device, first signal means having a signal for each of said columns of information exhibited by said first indicating device, second signal means having signals corresponding to said rows of information exhibited by said first indicating device, at least one of the control members of each of said first and second control means being cooperable with the signals of said first signal means to indicate the column of information exhibited by the first indicating device correlated to the setting of said one of the control members and at least one of the other control members of each of said first and second control means being cooperable with the signals of said second signal means to indicate the row of information exhibited by the first indicating device correlated to the setting of said one of the other control members, a second indicating device carrying a first set of information correlated to the settings of the third of said control means and to said one set of information exhibited by the first indicating device and carrying a second set of information correlated to the settings of the fourth of said control means and to said other set of information exhibited by the first indicating device, said first and said second sets of information carried by the second indicating device being arranged in columns and rows on said second indicating device, a third signal means having signals for each of said columns of information carried by said second indicating device, a fourth signal means having signals corresponding to said rows of information carried by the second indicating device, at least one of the control members of each of the third and fourth control means being cooperable with the signals of said third signal means to indicate the column of information carried by the second indicating device correlated to the setting of said one of the control members and at least one of the other control members of each of said third and fourth control means cooperating with the signals of said fourth signal means to indicate the row of information carried by the second indicating device correlated to the setting of said one of the other control members, means operable in one posiiton to obscure said first set of information carried by the second indicating device and in another position to obscure said second set of information carried thereby, means operable by movement of said first indicating device from said one position to said other position to cause movement of said obscuring means to said one position, and means operable upon movement of the first indicating device from said other position to said one position to cause movement of said obscuring means to said other position, whereby the proper column and row of the information exhibited by said first and second indicating devices correlated to the settings of the control means is indicated and only the set of information carried by the second indicating device correlated to the set of information exhibited by the first indicating device is visible.

10. The apparatus defined by claim 9 in which said first and said second sets of information are each arranged on said second indicating device in at least two columns spaced from and substantially parallel to each other, and said obscuring means is an opaque grid having at least two slots therethrough conforming in configuration to said columns of said first and said second sets of information carried by the second indicating device.

11. The apparatus defined by claim 9 in which said first signal means and said third signal means each has one signal aligned, respectively, with each of said columns of information exhibited by the first and second indicating devices, said one of the control members of each of said first and second control means being movable to positions adjacent each of the signals of the first signal means and said one of the control members of each of said third and fourth control means being movable to positions adjacent each of the signals of the third signal means, said second and said fourth signal means each has a signal corresponding to the even-numbered rows of information exhibited by the first and second indicating devices, respectively, and a signal corresponding to the odd-numbered rows of information exhibited by the first and second indicating devices, respectively, one of the other control members of each of said control means being movable to positions adjacent each of the signals of said second and said fourth signal means, respectively, and another of the control members of the control means having a pointer connected thereto for movement to positions adjacent each of the groups of two adjacent columns of information on both the first and the second indicating devices.

MARCEL PÉGARD.

References Cited in the file of this patent

UNITED STATES PATENTS

| Number | Name | Date |
| --- | --- | --- |
| 1,546,675 | Renney | Jan. 26, 1925 |
| 1,601,141 | Neal et al. | Jan. 28, 1925 |
| 1,634,625 | Nystrom | July 25, 1925 |
| 1,758,427 | Burger | May 13, 1930 |
| 1,813,002 | Hamersveld | July 7, 1931 |
| 1,817,723 | Hamersveld | Aug. 4, 1931 |
| 1,991,349 | Gallimore | Feb. 12, 1935 |